(12) United States Patent
Duplantis et al.

(10) Patent No.: US 8,182,018 B2
(45) Date of Patent: May 22, 2012

(54) DASH ASSEMBLY FOR GOLF CARS OR SIMILAR VEHICLES

(75) Inventors: Scott J. Duplantis, Evans, GA (US); Jesse E. Leech, Grovetown, GA (US); Paul E. Morgan, Appling, GA (US)

(73) Assignee: Club Car, LLC, Evans, GA (US)

( * ) Notice: Subject to any disclaimer, the term of this patent is extended or adjusted under 35 U.S.C. 154(b) by 338 days.

(21) Appl. No.: 12/359,049

(22) Filed: Jan. 23, 2009

(65) Prior Publication Data

US 2009/0206627 A1    Aug. 20, 2009

Related U.S. Application Data

(60) Provisional application No. 61/062,236, filed on Jan. 24, 2008.

(51) Int. Cl.
*B62D 25/14* (2006.01)
(52) U.S. Cl. ........................................................ 296/72
(58) Field of Classification Search ............... 296/24.34, 296/37.12, 70, 72, 203.02, 208
See application file for complete search history.

(56) References Cited

U.S. PATENT DOCUMENTS

| | | | | |
|---|---|---|---|---|
| 5,094,500 | A * | 3/1992 | Maypole et al. | 296/102 |
| D339,786 | S | 9/1993 | Allendorph et al. | |
| D403,641 | S | 1/1999 | Sacco et al. | |
| 5,857,726 | A | 1/1999 | Yokoyama et al. | |
| 5,883,777 | A | 3/1999 | Nishitani et al. | |
| 6,129,406 | A | 10/2000 | Dauvergne | |
| D436,069 | S | 1/2001 | O'Connell | |
| D470,091 | S | 2/2003 | Kraus et al. | |
| 6,582,002 | B2 * | 6/2003 | Hogan et al. | 296/37.12 |
| D489,660 | S | 5/2004 | Okumura et al. | |
| D494,115 | S | 8/2004 | McPeck et al. | |
| D512,357 | S | 12/2005 | Schuttera | |
| D514,995 | S | 2/2006 | Acton et al. | |
| D525,409 | S | 7/2006 | Cantrill et al. | |
| D532,353 | S | 11/2006 | Honda et al. | |
| D538,721 | S | 3/2007 | Woodard, Jr. et al. | |
| 7,210,723 | B2 * | 5/2007 | Sugawara et al. | 296/24.34 |
| D567,727 | S | 4/2008 | Kawaguchi et al. | |
| D571,272 | S | 6/2008 | Esaki et al. | |
| 7,401,835 | B2 | 7/2008 | Gresham et al. | |
| D577,640 | S | 9/2008 | Wyszogrod et al. | |
| D586,714 | S | 2/2009 | Woodard, Jr. et al. | |
| 2005/0224539 | A1 | 10/2005 | Hardy et al. | |
| 2006/0230869 | A1 | 10/2006 | Cosby et al. | |
| 2007/0152463 | A1 | 7/2007 | Hardy et al. | |
| 2007/0257508 | A1 * | 11/2007 | Ball et al. | 296/102 |
| 2008/0309113 | A1 * | 12/2008 | Baudart | 296/70 |
| 2009/0108618 | A1 * | 4/2009 | Hanson et al. | 296/72 |

FOREIGN PATENT DOCUMENTS

WO    2004/067360 A1    8/2004
WO    2004/067361         8/2004

OTHER PUBLICATIONS

Club Car Inc., Custom Dash Kit Installation Instructions, Copyright 2006, Publication AM10995, Edition Code 0204E0906D.

* cited by examiner

*Primary Examiner* — Glenn Dayoan
*Assistant Examiner* — Pinel Romain
(74) *Attorney, Agent, or Firm* — Michael Best & Friedrich LLP

(57) ABSTRACT

A dash assembly for a vehicle having a vehicle body defining an access opening includes a dashboard configured to extend across and generally obstruct the access opening. The dashboard includes a mounting tab configured to engage a portion of the vehicle body adjacent to the access opening. The dash assembly also includes a retainer having an elongated body configured to connect to the vehicle body. The elongated body extends at least partially about a perimeter of the access opening such that the mounting tab of the dashboard is sandwiched between the retainer and the portion of the vehicle body to secure the dashboard to the vehicle body.

16 Claims, 12 Drawing Sheets

DASH ASSEMBLY FOR GOLF CARS OR SIMILAR VEHICLES

CROSS-REFERENCE TO RELATED APPLICATIONS

This application claims priority to U.S. Provisional Patent Application No. 61/062,236, filed Jan. 24, 2008, the entire contents of which are hereby incorporated by reference.

BACKGROUND

The present invention relates to vehicles such as golf cars and utility vehicles and, more particularly, to dash assemblies for such vehicles.

Vehicles such as golf cars, utility vehicles, or the like typically include rear mounted engines or motors such that space is available forwardly of the passenger compartments. As such, these vehicles often include shell-like brow members mounted to front ends of the vehicle bodies so as to provide storage cavities and access openings into the cavities. In some vehicles, a dashboard may be provided to enclose or obstruct the access opening into the storage cavity. The dashboard may also provide mounting surfaces for various components of the vehicle.

SUMMARY

In one embodiment, the invention provides a dash assembly for a vehicle. The vehicle includes a vehicle body defining an access opening. The dash assembly includes a dashboard configured to extend across and generally obstruct the access opening. The dashboard includes a mounting tab configured to engage a portion of the vehicle body adjacent to the access opening. The dash assembly also includes a retainer having an elongated body configured to connect to the vehicle body. The elongated body extends at least partially about a perimeter of the access opening such that the mounting tab of the dashboard is sandwiched between the retainer and the portion of the vehicle body to secure the dashboard to the vehicle body.

In another embodiment, the invention provides a vehicle including a vehicle body defining an access opening and a dashboard extending across and generally obstructing the access opening. The dashboard includes a mounting tab engaging a portion of the vehicle body adjacent to the access opening. The vehicle also includes a retainer having an elongated body connected to the vehicle body. The elongated body extends at least partially about a perimeter of the access opening such that the mounting tab of the dashboard is sandwiched between the retainer and the portion of the vehicle body to secure the dashboard to the vehicle body.

In yet another embodiment, the invention provides a method of mounting a dashboard to a vehicle. The vehicle includes a vehicle body defining an access opening. The method includes positioning the dashboard on the vehicle body to generally obstruct the access opening, engaging a portion of the vehicle body adjacent to the access opening with a mounting tab of the dashboard, and connecting a retainer to the vehicle body. The retainer includes an elongated body extending at least partially about a perimeter of the access opening such that the mounting tab of the dashboard is sandwiched between the retainer and the portion of the vehicle body to secure the dashboard to the vehicle body.

The foregoing summary, as well as the detailed description of the preferred embodiments of the present invention, will be better understood when read in conjunction with the appended drawings. For the purpose of illustrating the invention, there is shown in the drawings, which are diagrammatic, only some embodiments of the invention. It should be understood, however, that the present invention is not limited to the precise arrangements and instrumentalities shown.

DETAILED DESCRIPTION

Figure 1:
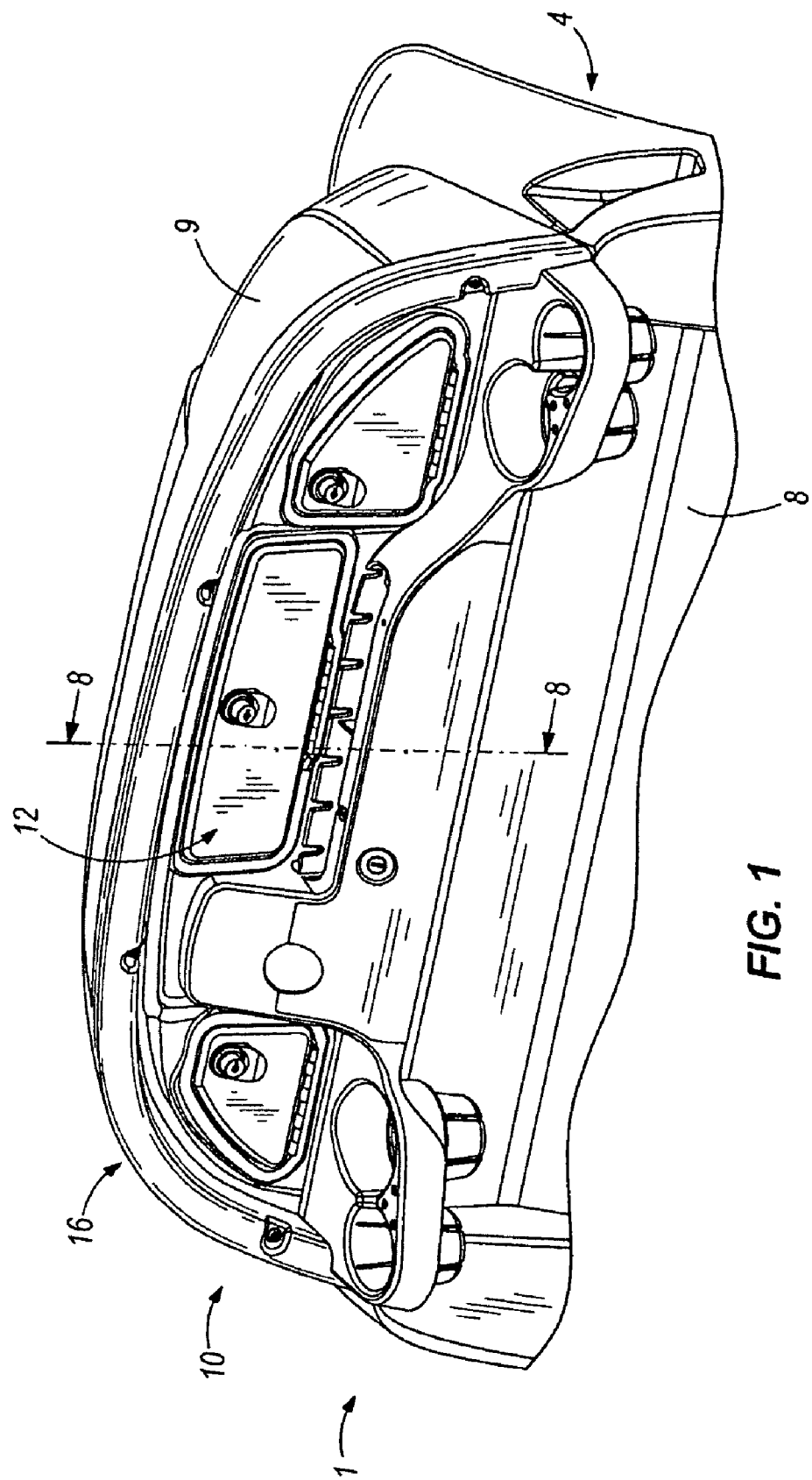
FIG. 1 is a rear perspective view of a portion of a vehicle including a dash assembly embodying the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Referring now to the drawings in detail, wherein like numbers are used to indicate like elements throughout, there is shown in FIGS. 1-12 a dash assembly 10 for a vehicle 1. In the illustrated embodiment, the vehicle 1 is a golf car, but may alternatively be, for example, a utility vehicle, a neighborhood vehicle, or a similar passenger vehicle. The illustrated vehicle 1 includes a frame 2, a plurality of wheels 3 (FIG. 10) mounted to the frame 2, and a body 4 disposed on the frame 2 and having a storage cavity 5 with an access opening 5a.

The dash assembly 10 includes a dashboard 12 and at least one retainer 16. The dashboard 12 extends generally across the access opening 5a to substantially obstruct the opening 5a and includes at least one mounting tab 14. The at least one retainer 16 connects to the vehicle body 4 such that the at least one dashboard tab 14 is generally sandwiched between the retainer 16 and the body 4, securing the dashboard 12 to the vehicle 1. The retainer 16 is removable from the vehicle body 4 such that the dashboard 12 may also be detached or disconnected from the vehicle 1, although the dashboard 12 may remain disposed on the vehicle 1 when the retainer 16 is removed. Once the retainer 16 is disconnected from the body 4, the dashboard 12 may then be removed or demounted by simply lifting the dashboard 12 off of and away from the vehicle 1.

Figure 3:
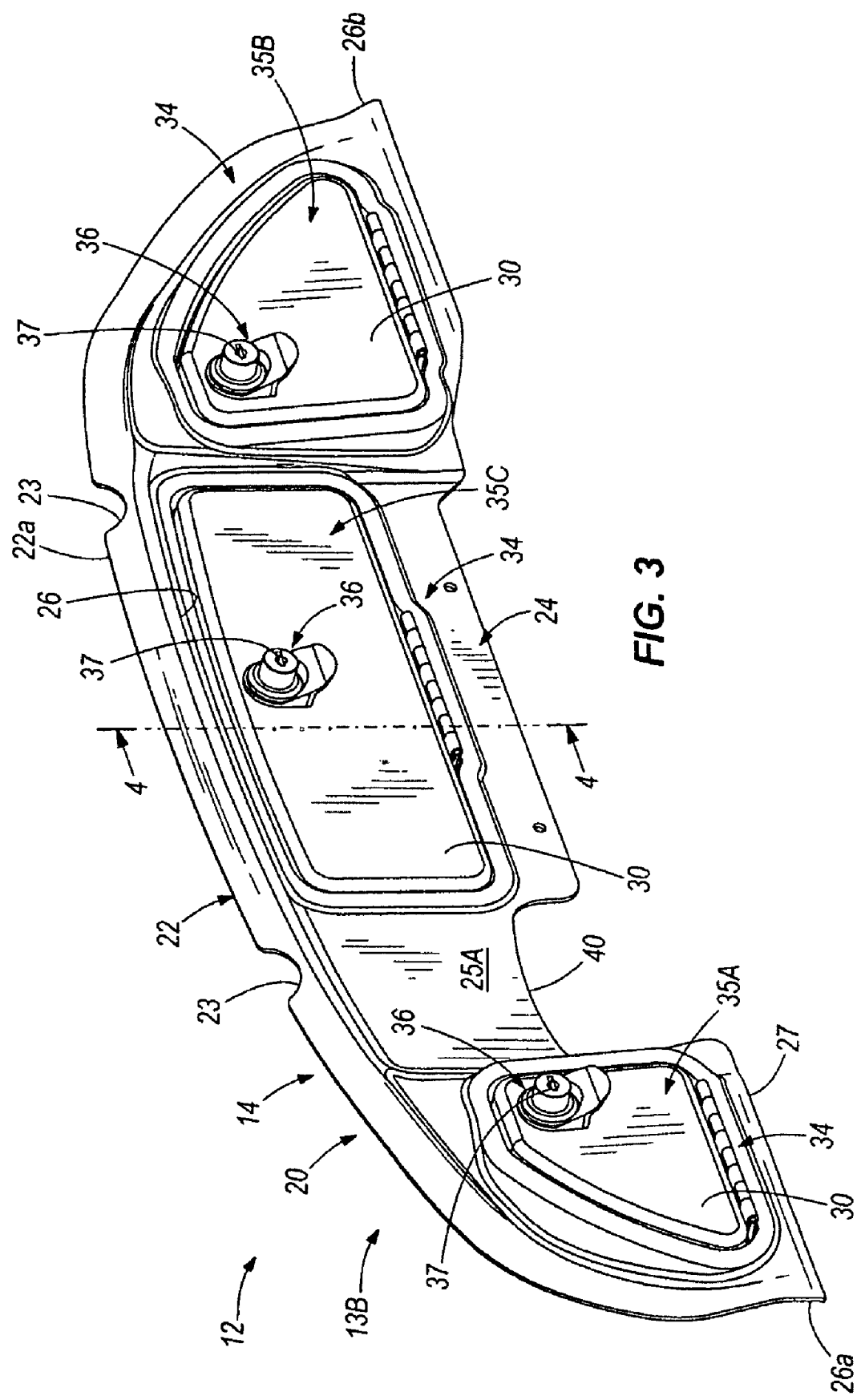
FIG. 3 is a plan view of a dashboard of the dash assembly shown in FIG. 1.
Figure 4:
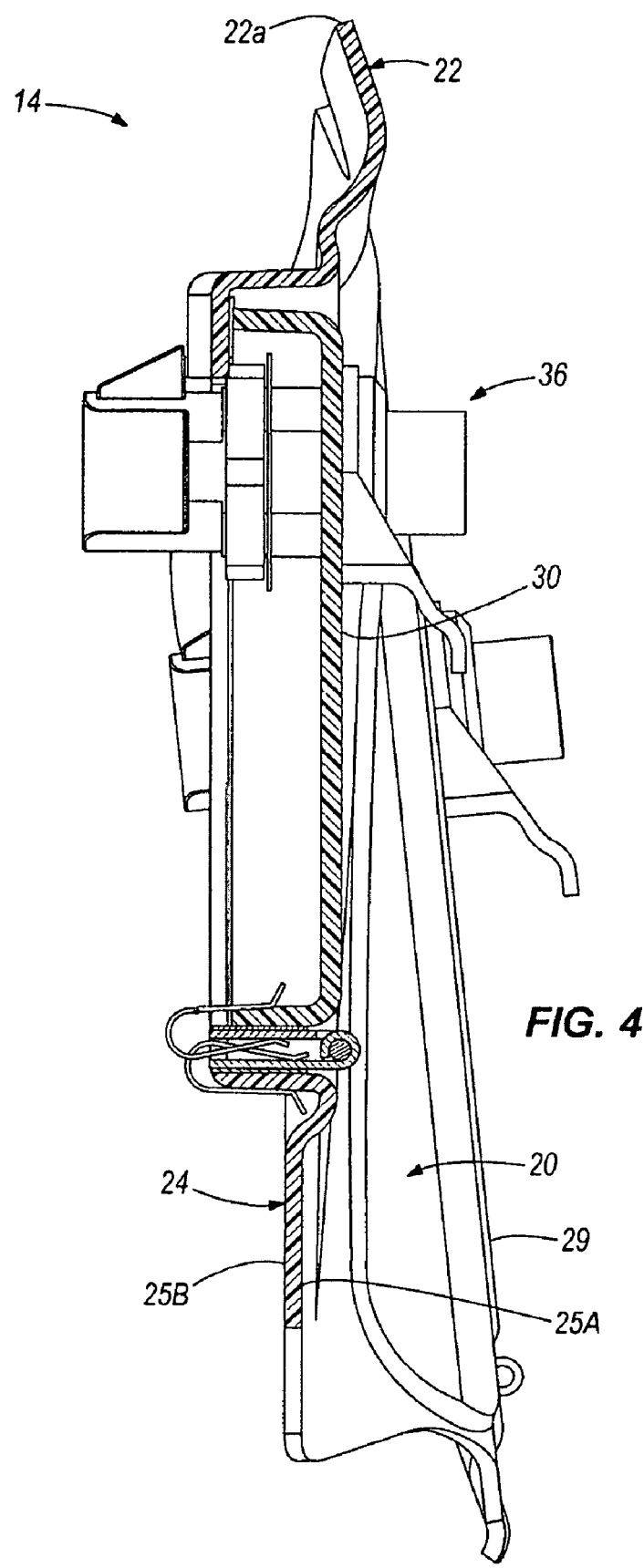
FIG. 4 is a cross-sectional view of the dashboard taken along section line 4-4 of FIG. 3.

As shown in FIG. 3, the dashboard 12 includes a generally planar main body section 20 sized to at least substantially occupy the vehicle access opening 5a and the at least one mounting tab 14 includes a generally elongated edge section 22 integrally formed with the main body section 20. The mounting tab edge section 22 is disposable against one or more support surfaces 6 (FIGS. 8, 9, and 11) on the vehicle body 4 located adjacent to the access opening 5a. In the illustrated embodiment, the support surface 6 is generally elongated and extends partially circumferentially about the cavity 5. The illustrated support surface 6 is positioned adjacent to an open end 7a of a brow 7 of the vehicle body 4.

Figure 2:
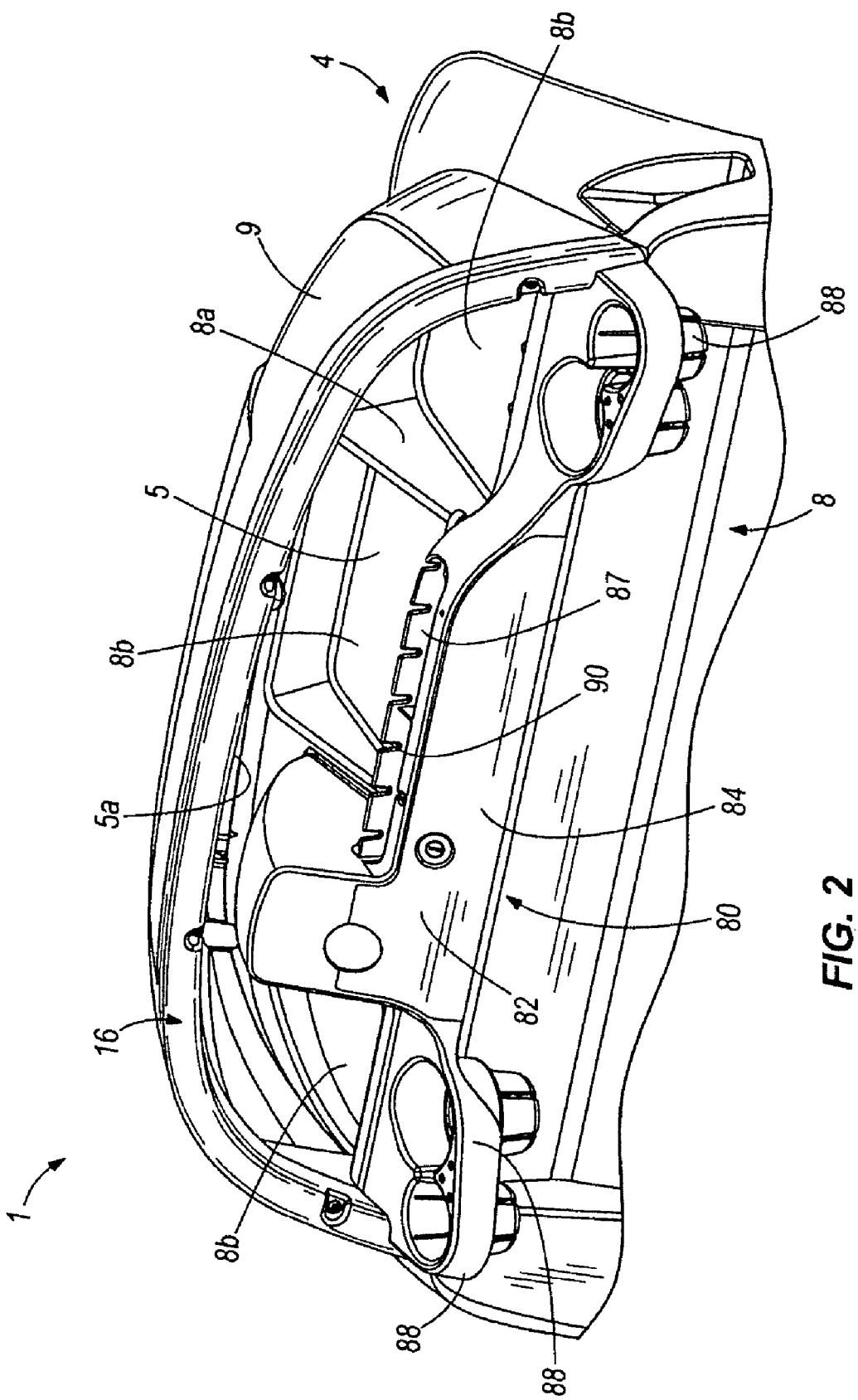
FIG. 2 is another rear perspective view of the portion of the vehicle shown in FIG. 1 with portions of the dash assembly removed.
Figure 7:
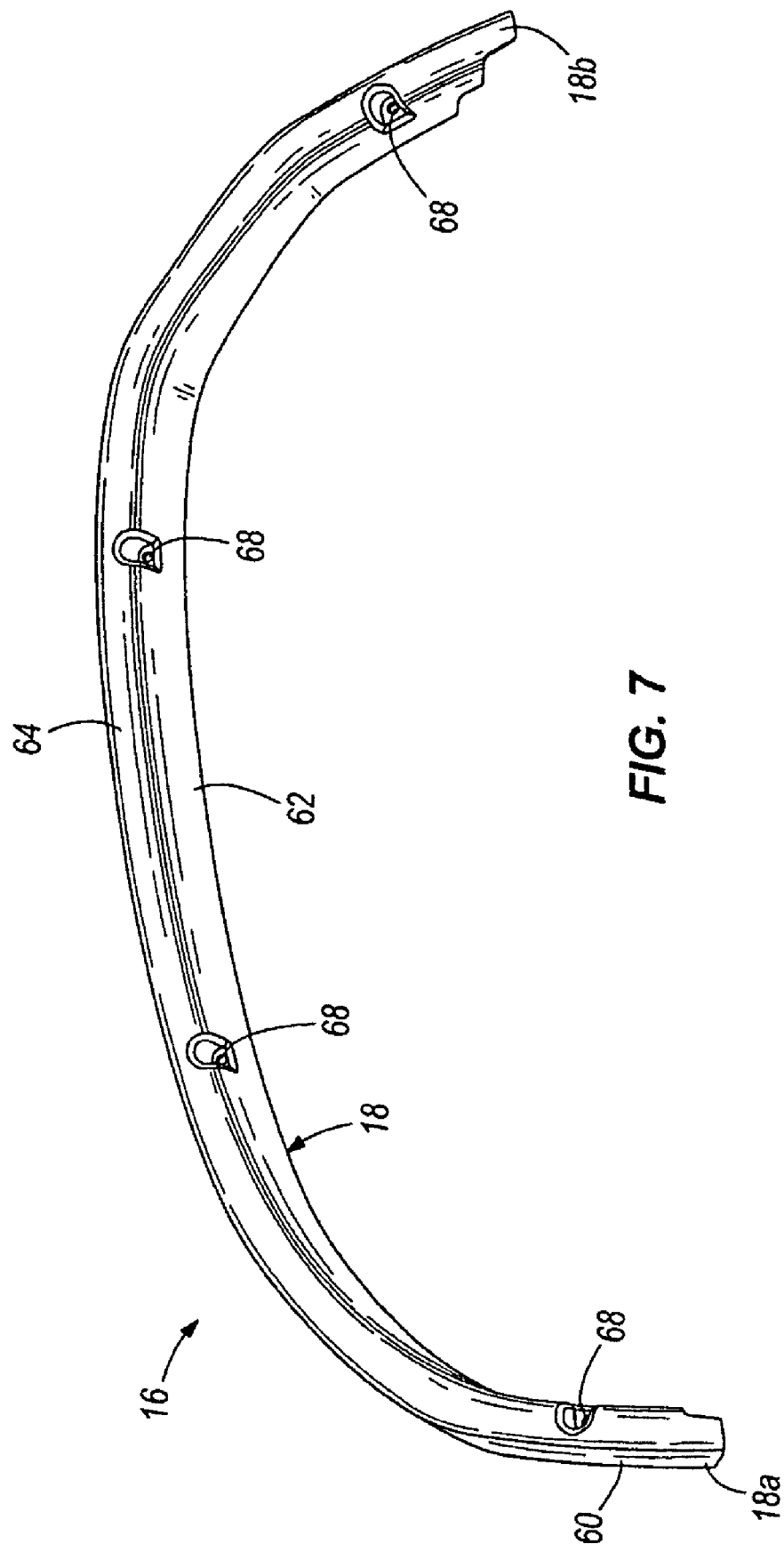
FIG. 7 is front perspective view of a retainer for use with the dash assembly shown in FIG. 1.
Figure 8:
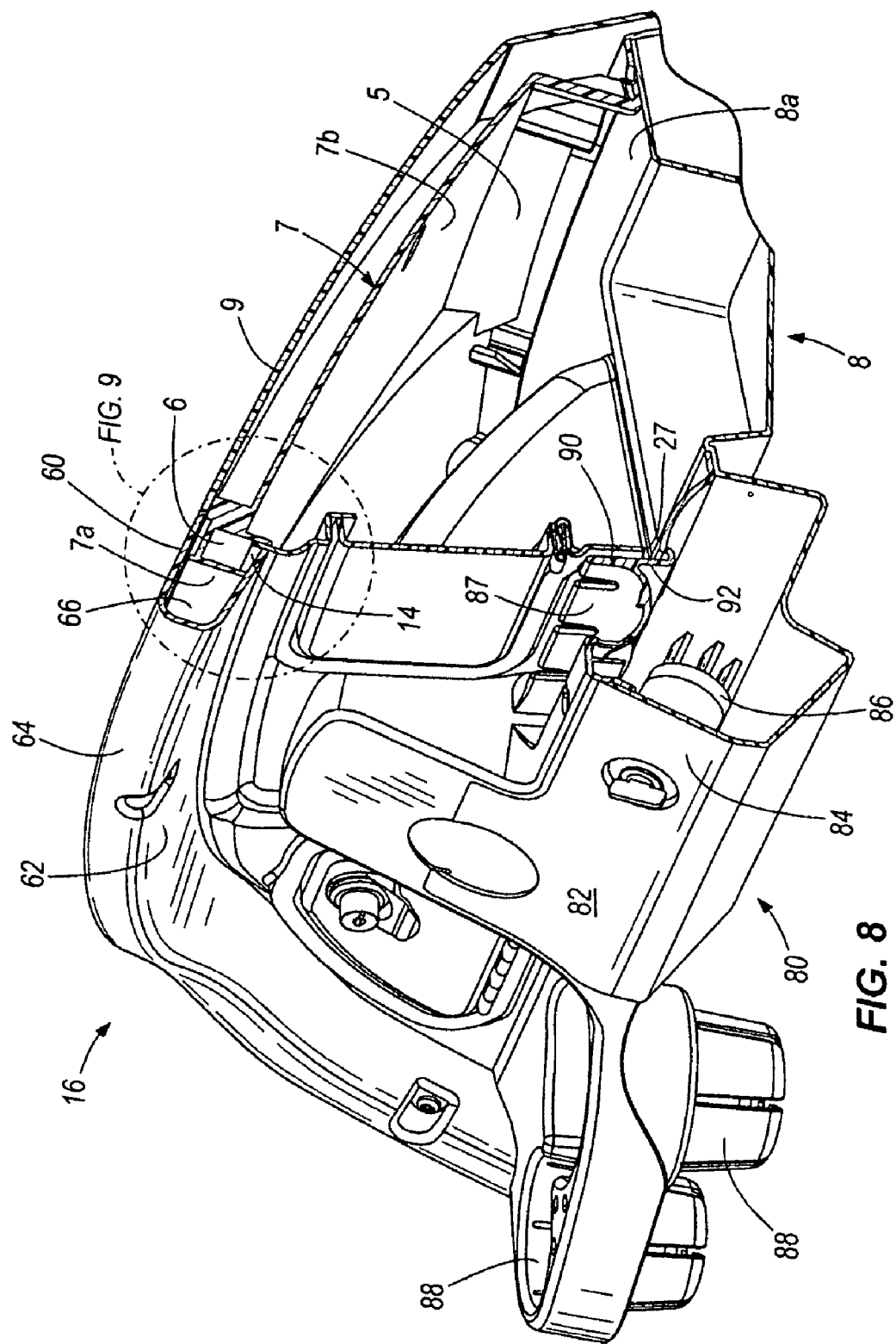
FIG. 8 is a perspective cross-sectional view of the dash assembly mounted to the portion of the vehicle shown in FIG. 1.

Referring to FIGS. 2, 7, and 8, the retainer 16 includes an elongated body 18 configured to extend at least partially circumferentially about the access opening 5a when connected with the vehicle body 4. In the illustrated embodiment, the elongated body 18 extends about at least half of the perimeter of the dashboard 12 and the access opening 5a. The illustrated retainer 16 is also shaped to conform to the shape and size of the open end 7a of the brow 7, as discussed below. The elongated edge section 22 of the dashboard 12 that provides the mounting tab 14 is sandwiched between the retainer body 18 and the body support surface 6 when the dashboard 12 is mounted to the vehicle body 4.

Referring to FIGS. 3-6, the illustrated main body section 20 is formed as an elongated, generally flat and generally rectangular plate 24 with front and rear surfaces 25A, 25B (FIG. 4), an arcuate upper edge 26, and a lower edge 27 extending between opposing ends 26a, 26b of the arcuate upper edge 26. The mounting tab elongated edge section 22 extends outwardly from and generally along the arcuate upper edge 26 so as to extend partially circumferentially about the perimeter of the plate 24. Although a single, elongated integral mounting tab 14 is illustrated, the dashboard 12 may include two or more integral mounting tabs 14 of any appropriate shape (e.g., rectangular projections) or the tab(s) 14 may be separate members attached or connected to the plate 24 with, for example, brackets and/or fasteners.

Figure 9:
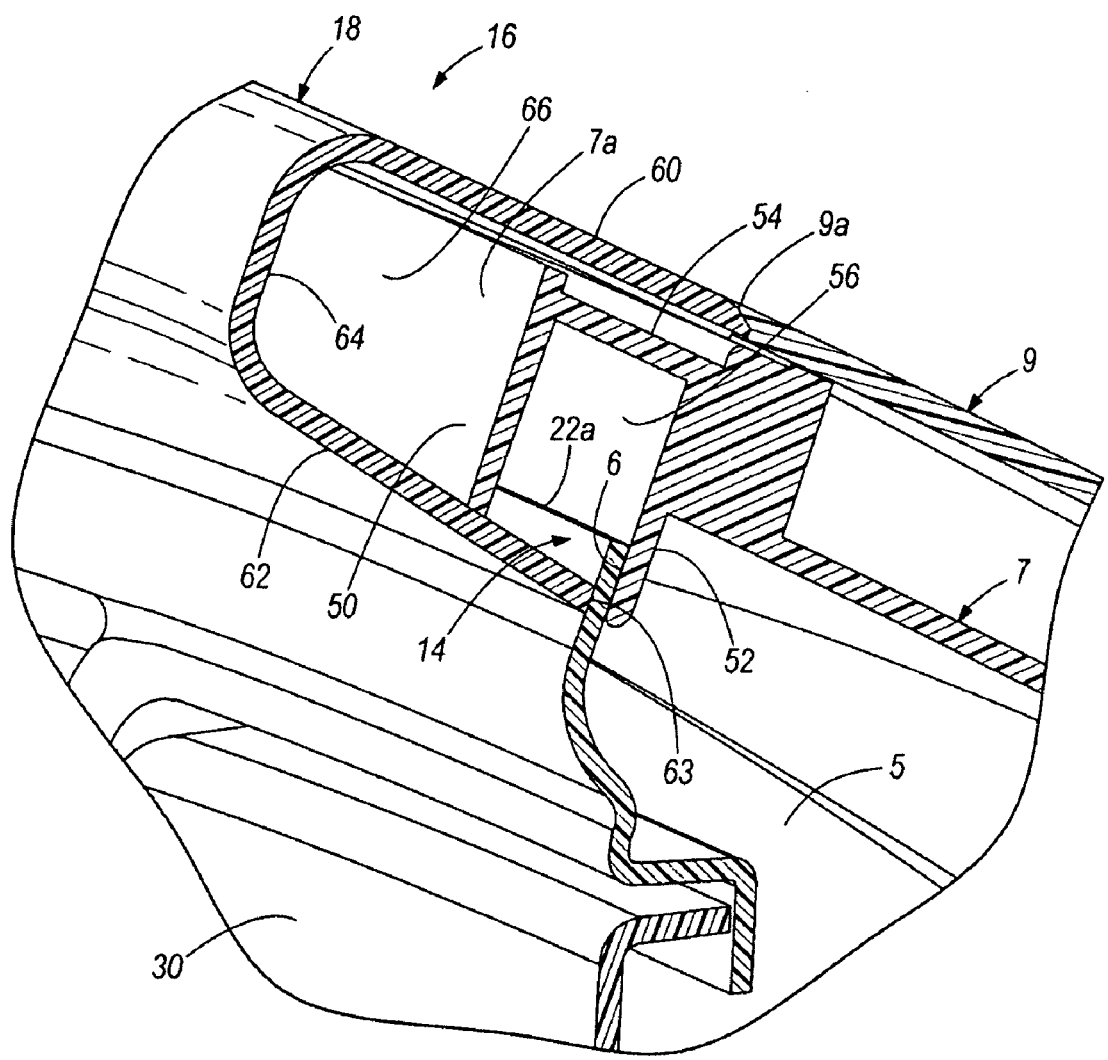
FIG. 9 is an enlarged perspective cross-sectional view of a portion of the dash assembly and the vehicle shown in FIG. 8.
Figure 10:
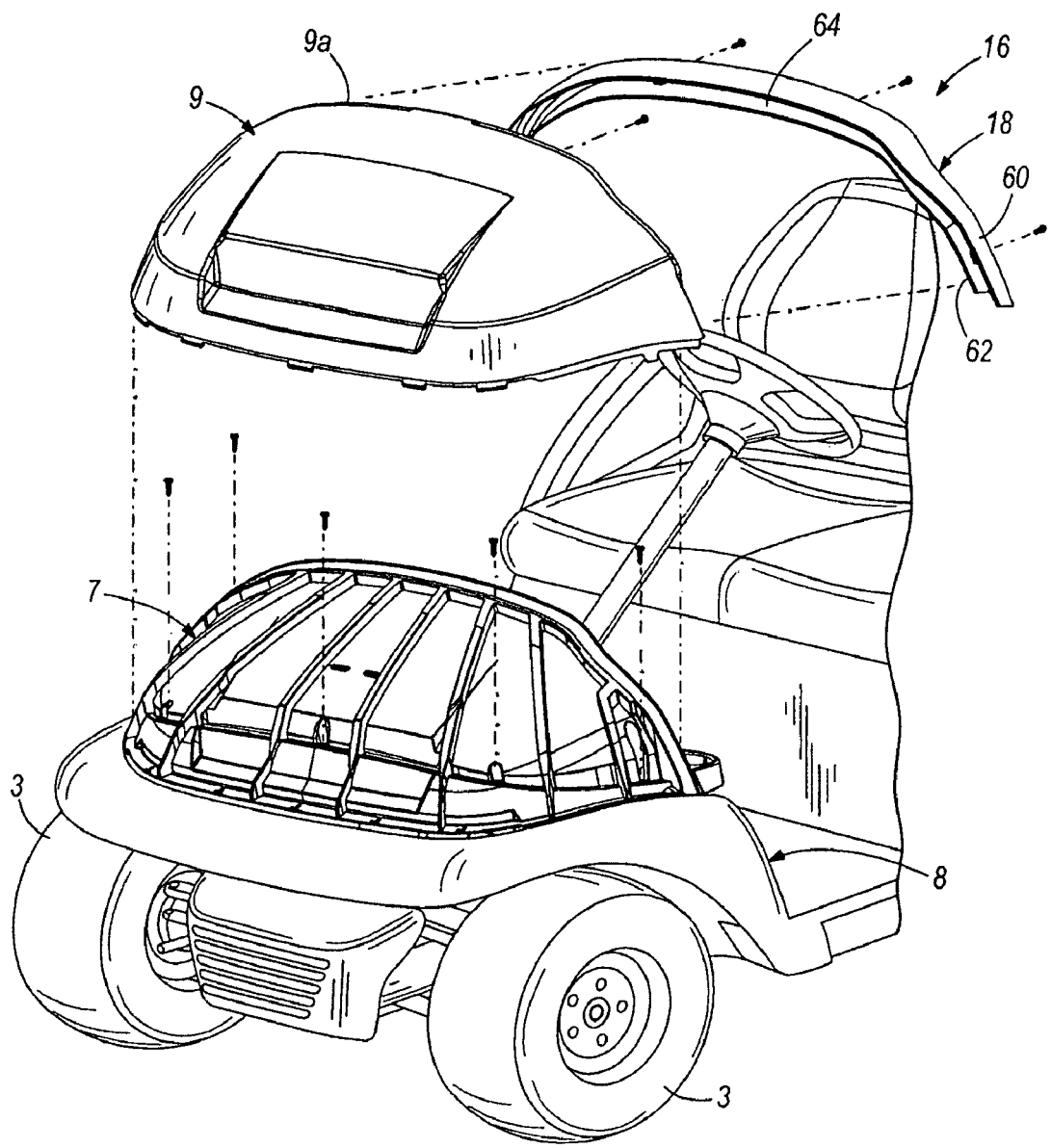
FIG. 10 is a partly exploded front perspective view of the vehicle shown in FIG. 1.

Referring now to FIGS. 2, 8, 10 and 11, the brow 7 is formed as a clam shell with an arcuate open end 7a. The cavity 5 is defined between the lower or inner surface 7b of the brow 7 and the upper surface 8a of a front end member 8 of the body 4. As such, the access opening 5a is generally rectangular, as shown in FIG. 2. With this structure, the dashboard main body section 20 is sized to conform to and occupy the generally rectangular access opening 5a, with the main body lower edge 27 being disposed generally upon the front end member upper surface 8a and the elongated mounting tab section 22 extending across or overlapping the brow open end 7a, as shown in FIGS. 1, 8, and 9.

Referring to FIGS. 3-6, the dashboard 12 defines at least one and preferably a plurality of openings 28 (FIGS. 5 and 6) extending through the body plate 24. The openings 28 are configured to provide access to the cavity 5 when the dashboard 12 is disposed or installed on the vehicle body 4. The dashboard 12 also includes at least one and preferably a plurality of reinforcing projections 29. Each projection 29 extends outwardly from the plate front surface 25A and is positioned circumferentially about one of the openings 28.

Figure 11:
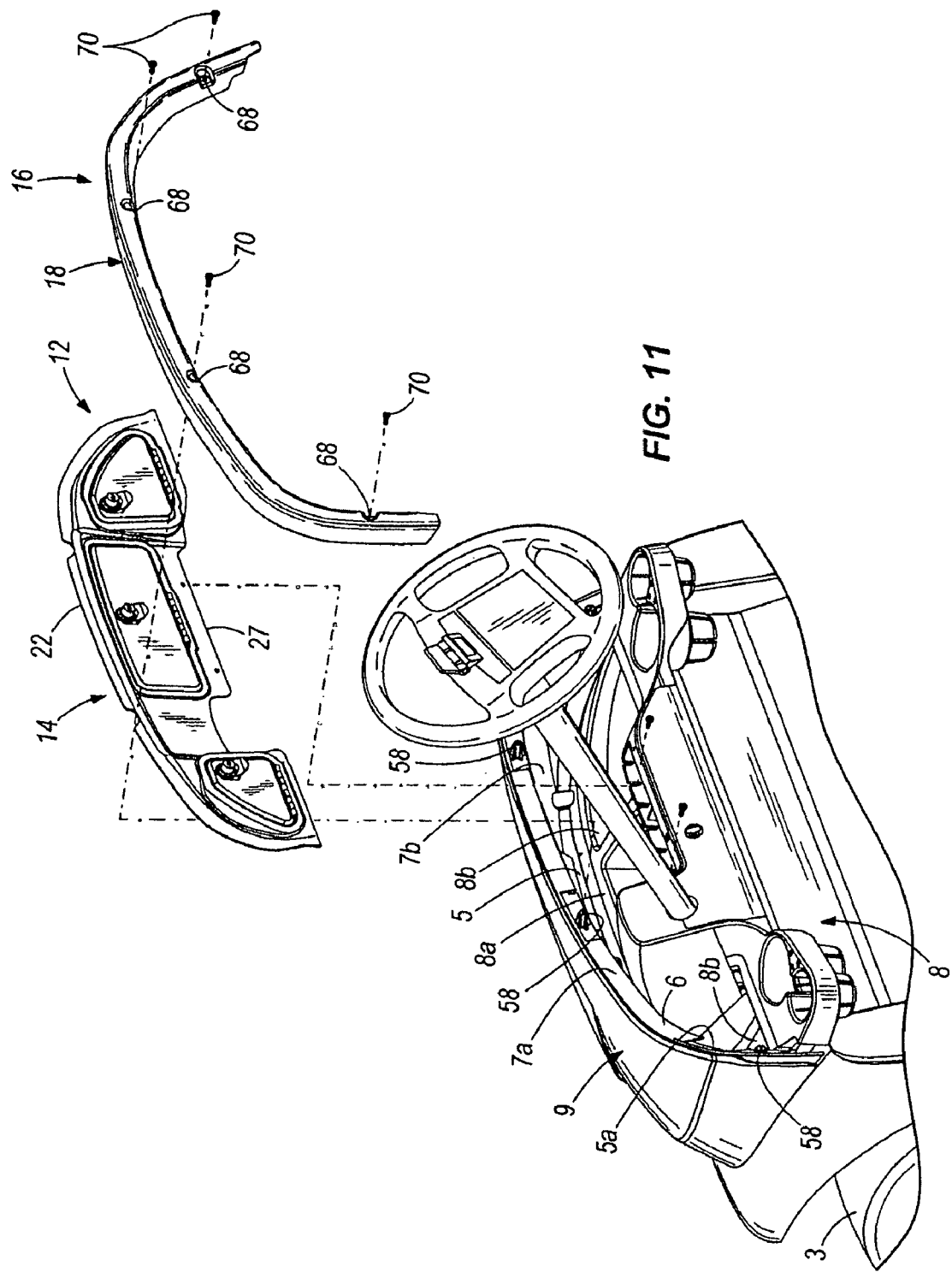
FIG. 11 is a partly exploded rear perspective view of the vehicle shown in FIG. 10.

In the illustrated embodiment, the dashboard 12 includes at least one and preferably a plurality of movable doors 30. Each door 30 is configured to obstruct, and alternatively permit access through, a separate one of the dashboard opening(s) 28. Each opening 28 and the associated door 30 forms a separate access assembly 34 configured to enable a user (i.e., a vehicle driver or passenger) to store one or more items at various locations within the body cavity 5. As shown in FIGS. 2 and 11, the front end member 8 of the vehicle body has a plurality of storage recesses 8b configured to contain various items and each access assembly 34 is located generally adjacent to one of the storage recesses 8b to enable a user to store or retrieve items therein.

Figure 5:
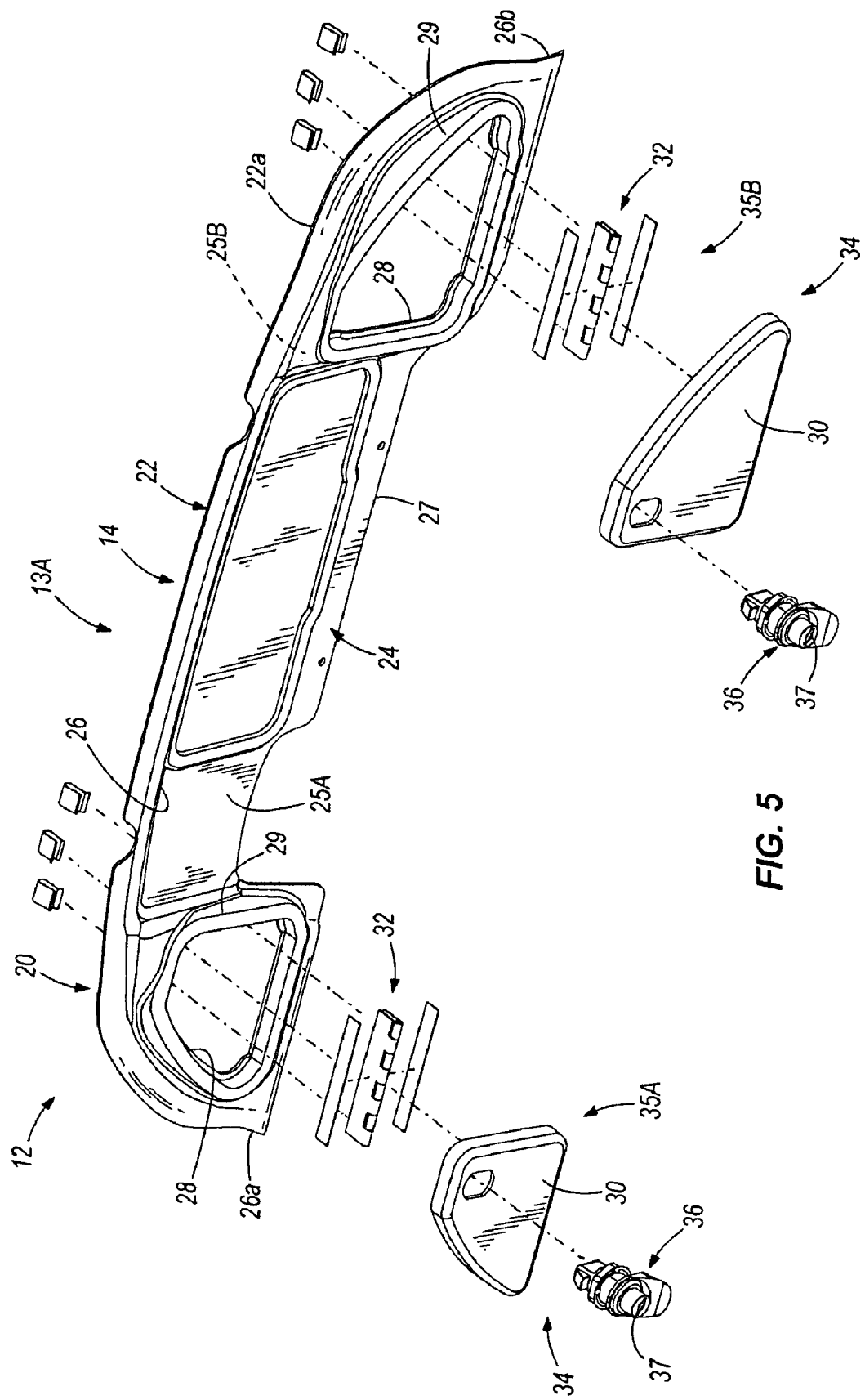
FIG. 5 is an exploded perspective view of an embodiment of the dashboard including two doors.
Figure 6:
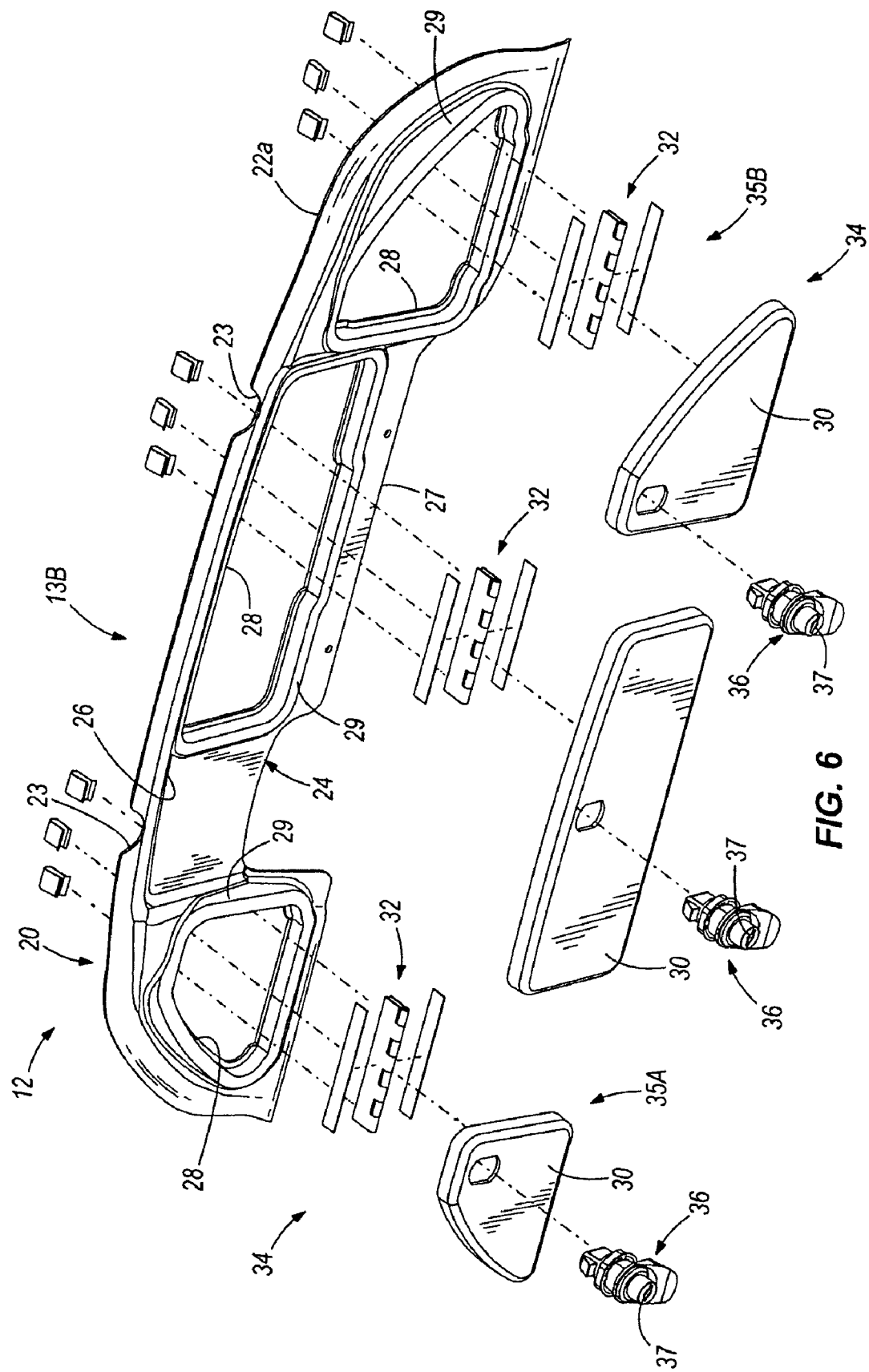
FIG. 6 is an exploded perspective view of another embodiment of the dashboard including three doors.

As shown in FIGS. 5 and 6, each door 30 is pivotally coupled to the main body section 20 by means of a hinge 32 so as to be movable between an open position (not shown) and a closed position (FIGS. 1, 3, and 8). In other embodiments, the doors 30 may be pivotally coupled to the dashboard 12 by other appropriate means such as, for example, a pair of stub shafts, or may be slidably or otherwise movably coupled with the dashboard 12. In the illustrated embodiment, each access assembly 34 also includes a latch assembly 36 configured to releasably secure the associated door 30 in the closed position. Each latch assembly 36 is mounted on the associated door 30 and is releasably engageable with a portion of the main body section 20 that defines the associated opening 28. Alternatively, the latch assemblies 36 may be mounted on the main body section 20 and engageable with the door 30. In some embodiments, the latch assemblies 36 may each be a "passage" type of latch without any locking capability. In other embodiments, such as the embodiment shown in FIG. 3, the latch assemblies 36 may include a locking mechanism 37 for more secure storage in one or more sections of the body cavity 5.

Referring to FIGS. 3, 5, and 6, the illustrated dashboard 12 is formed with either two or three access openings 28 and associated doors 30. In a "two-door" dashboard model 13A, as shown in FIG. 5, the dashboard 12 includes two side access assemblies 35A, 35B. Each side access assembly 35A, 35B is disposed proximate to one of the dashboard lateral ends 26a, 26b, respectively. Each side access assembly 35A, 35B includes a generally triangular shaped opening 28 and a correspondingly shaped door 30. In a "three-door" dashboard model, as shown in FIGS. 3 and 6, the dashboard 12 includes the two side access assemblies 35A, 35B and a central access assembly 35C disposed generally between the side assemblies 35A, 35B. The central access assembly 35C is disposed between a steering wheel clearance cut-out 40 and the passenger side access assembly 35B. In the illustrated embodiment, the central access assembly 35C includes a generally elongated, rectangular opening 28 and a correspondingly shaped door 30.

A particular vehicle 1 (FIG. 1) may be provided with either the two-door dashboard model 13A or the three-door dashboard model 13B and may be readily converted between the two models 13A, 13B by simply removing the retainer 16 and replacing the specific dashboard 12 with the other model 13A, 13B. Although the illustrated dash assembly 10 is formed with one or more access assemblies 34, the dashboard 12 may alternatively be formed with only "uncovered" access openings 28 and without any doors 30. In still other embodiments, the dashboard 12 may be formed without any access openings 28 (and thus no doors 30) and may instead be configured primarily for mounting various components (e.g., vehicle gauges, accessory-mounting brackets, containers, score card holders, etc.) to the dashboard 12.

Referring to FIGS. 7-11, the elongated body 18 of the illustrated retainer 16 is generally arcuate or C-shaped and is formed to correspond to the shape of the body brow 7. The illustrated vehicle body 4 includes a cover member or cowl 9 that is sized and shaped to generally closely overlap the brow 7 and has an edge 9a adjacent to the brow open end 7a. As shown in FIG. 9, the brow open end 7a is formed by a pair of spaced apart, outer and inner generally vertical wall sections 50, 52 connected by a generally horizontal wall section 54 so as to form a generally rectangular groove 56. The inner vertical wall section 52 also provides the support surface 6 for engaging the dashboard 12. The dashboard mounting tab 14 extends at least partially into the brow groove 56 when the dashboard 12 is mounted on the vehicle body 4, as shown in FIGS. 8 and 9.

With such a brow structure, the elongated retainer body 18 is generally hollow and has a U-shaped cross section. The illustrated elongated body 18 includes spaced apart, upper and lower leg sections 60, 62 connected by a base section 64. An elongated channel 66 (FIGS. 8 and 9) is defined between the three sections 60, 62, 64 and extends between the two ends 18a, 18b of the body 18. As shown in FIG. 9, each leg section 60, 62 has an elongated outer edge 61, 63, respectively. The edge 63 of the lower wall section 62 is disposable against the one or more mounting tabs 14 of the dashboard 12, as described below.

When the retainer 16 is assembled onto the brow 7, the retainer upper leg 60 extends over or overlaps the cowl edge 9a to secure the cowl 9 to the brow 7. The retainer 16 thereby functions as a "brow cap". As such, the outer vertical wall section 50 and horizontal wall section 54 of the brow 7 become disposed within the retainer channel 66, while the retainer lower leg section 62 extends beneath the brow outer vertical wall section 50 until the lower leg edge 63 abuts the dashboard mounting tab 14. When dashboard 12 is removed from the vehicle 1, the lower leg edge 63 directly abuts the brow support surface 6.

Figure 12:
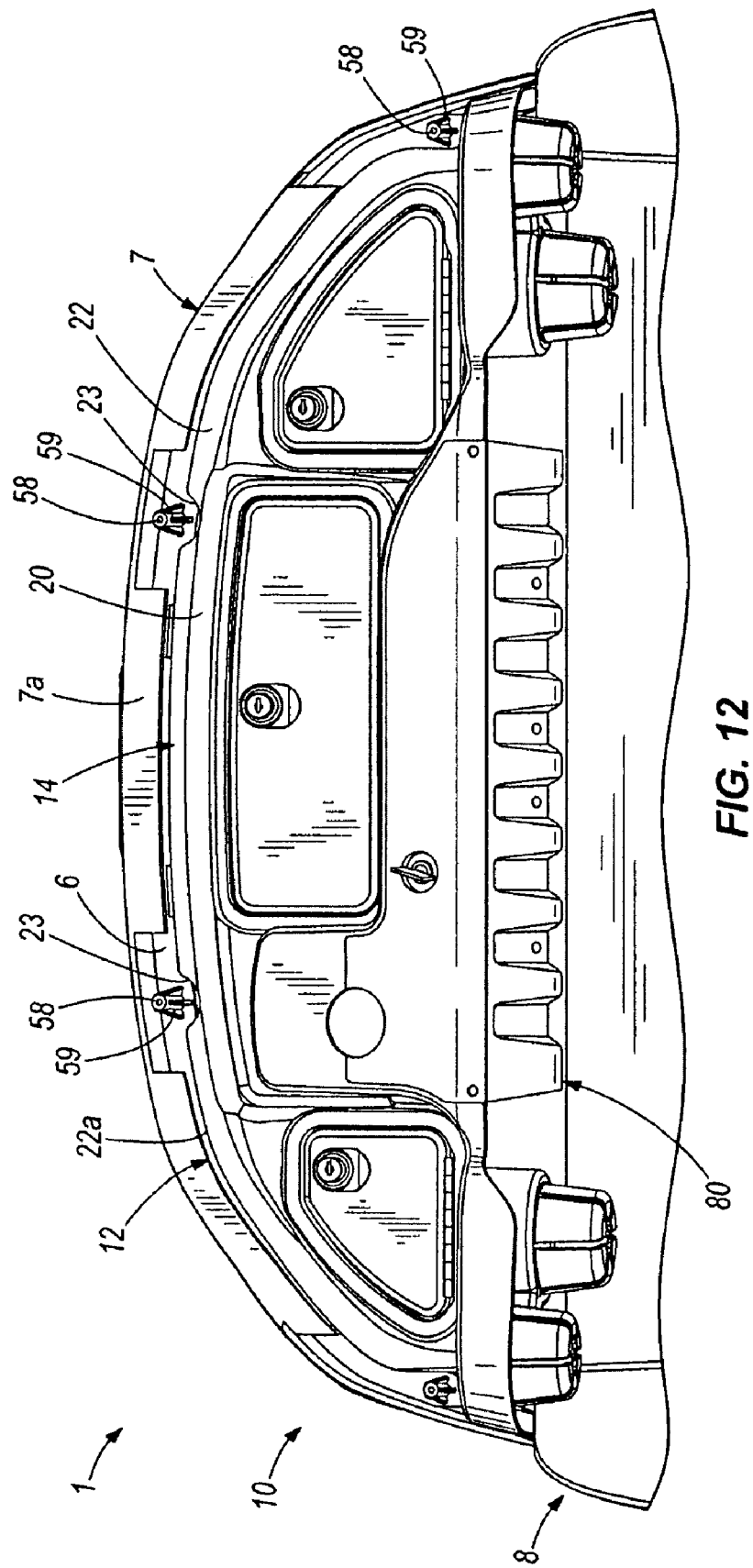
FIG. 12 is a plan view of the dash assembly mounted to a portion of the vehicle with the retainer removed.

As shown in FIG. 11, the brow 7 includes a plurality of mounting holes 58 and the retainer 16 includes a plurality of clearance holes 68. Each clearance hole 68 is at least generally alignable with one of the mounting holes 58. The vehicle 1 also includes at least one and preferably a plurality of fasteners 70. The fasteners 70 (e.g., screws, bolts, etc.) are configured to securely attach the retainer 16 to the vehicle body 4. As such, the dashboard 12 is removable from the vehicle 1 simply by disconnecting the fastener(s) 70 from the body 4. In the illustrated embodiment, each fastener 70 is at least partially threaded and engages interior threads of the brow mounting holes 58, which may be directly formed in the brow 7 or provided by separate inserts 59 (FIG. 12). The fasteners 70 extend through the retainer channel 66 (FIG. 9) at a position generally above the outer edge 22a of the dashboard mounting edge section 22. As shown in FIG. 12, the edge section 22 defines two clearance scallops 23, or cutouts, to position the two inner fasteners 70 proximate to the remainder of the mounting tab 14 and thereby increase clamping pressure on the tab 14. In other embodiments, the mounting edge section 22 may define clearance holes (not shown) to permit the fasteners 70 to extend directly through the dashboard 12.

Although threaded fasteners 70 are shown in the illustrated embodiment, the fasteners 70 may alternatively be another type of releasable fastener such as, for example, a detent pin, a latch, or the like. In the still other embodiments, the retainer 16 may be removably coupled to the vehicle body 4 using other appropriate coupling means such as one or more clamping members. Additionally or alternatively, the retainer 16 may be formed in any other appropriate manner that enables the dash assembly 10 to be removably mounted to the vehicle body 4 as generally described above. For example, in some embodiments, the retainer body 18 may be a generally solid member that is configured to abut against the brow 7 and/or the dashboard mounting tab(s) 14, may be formed of two or more discrete sections or pieces, and/or may be a generally straight member that extends along only a portion of the brow 7. The scope of the present invention encompasses these and all other appropriate structures of the retainer and/or fasteners 70 that enable the dashboard 12 to be removably mounted to the vehicle 1.

Referring to FIGS. 2, 8, and 12, the vehicle body 4 includes a dash accessory member 80 connected to the front end member 8 so as to be located generally below the brow access opening 5a and the dashboard 12. The accessory member 80 extends along an edge portion of the dashboard 12 not covered by the retainer 16 such that the entire perimeter of the dashboard 12 is engaged by either the retainer 16 or the accessory member 80. The accessory member 80 includes a steering wheel base 82, a mounting section 84 for an ignition assembly 86, a tray 87, and a plurality of cup holders 88.

The illustrated accessory member 80 also includes a generally vertical retention surface 90 defined by the inner surface of the tray 87 and a generally horizontal accessory support surface 92 extending from the vertical retention surface 90. The two surfaces 90, 92 are located generally adjacent to the access opening 5a and to the retention surface generally facing the opening 5a. When the dashboard 12 is disposed on the vehicle body 4, the dashboard lower edge 27 is disposed on the accessory support surface 92 and a lower section of the dashboard front surface 25A is disposed generally against the retention surface 90. As such, the retention surface 90 substantially prevents movement of the dashboard 12 in a direction generally away from the storage cavity 5. In other embodiments, the dash accessory member 80, or even a section of the main body section 20, may define a groove configured to receive the lower edge of the dashboard 12 such that the groove both vertically supports and horizontally retains the lower portion of the dashboard 12.

The dash assembly 10 is installed on the vehicle 1 in generally the following manner. First, if not already removed, the retainer 16 is disconnected from the vehicle body 4 by removing the fasteners 70 from the open end 7a of the brow 7. Then, the dashboard 12 is placed on the vehicle body 4 by positioning the dashboard body 20 within the access opening 5a, the elongated mounting tab section 22 against the brow support surface 6, and the dashboard lower edge 27 on the accessory support surface 92, as shown in FIG. 12. Next, the retainer 16 is placed on the brow open end 7a so as to overlap the cowl 9 and abut against the mounting tab 14. Finally, the fasteners 70 are used to connect the retainer 16 with the brow 7, thereby sandwiching the mounting tab 14 between the retainer lower leg edge 63 and the brow support surface 6 to secure the dashboard 12 to the vehicle 1.

When it is desired to remove the dashboard 12 from the vehicle 1, the retainer 16 is disconnected from the brow 7 by removing the fasteners 70. The dashboard 12 is then disconnected or detached from the vehicle body 4 by lifting the dashboard 12 away from the access opening 5a. If desired, a new or alternate dashboard may then be positioned on the vehicle body 4 and secured with the retainer. Alternatively, the retainer 16 may be reconnected directly to the vehicle body 4 without a dashboard.

The illustrated dashboard 12 is thereby mounted and removed by connecting or disconnecting the retainer 16 from the vehicle body 4. In particular, the dashboard 12 is mounted and dismounted by simply installing or removing the four fasteners 70 from the retaining member 16 without requiring specialized tools or permanently altering/destroying any components of the dash assembly 10 or the vehicle 1. The dash assembly 10 is also constructed to match the existing structure and contours of the vehicle body 4 (e.g., the brow 7, the front end member 8, and the dash accessory member 80) to maintain the overall aesthetic appearance of the vehicle 1.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined herein.

Various features and advantages of the invention are set forth in the following claims.

What is claimed is:

1. A dashboard for a vehicle including a frame, a plurality of wheels mounted to the frame, and a body disposed on the frame, the body having a brow, a front end member, a storage cavity, and a retainer, the storage cavity having an access opening between the brow and the front end member, the brow including a plurality of mounting holes, the front end member defining a groove, and the retainer being coupled to the brow via fasteners that engage the mounting holes, the dashboard comprising:
   a body section defining a mounting tab and a lower edge,
   wherein the lower edge is inserted into the groove such that the lower edge is both vertically supported and horizontally retained by the groove;
   wherein the body section is arranged to substantially obstruct the access opening;
   wherein the mounting tab is sandwiched between the brow and the retainer; and
   wherein the dashboard is coupled to the vehicle by engagement of the lower edge in the groove and the mounting tab being sandwiched between the brow and the retainer.

2. The dashboard of claim 1, wherein the body section defines a dashboard opening that provides access to the storage cavity.

3. The dashboard of claim 2, further comprising a door movably coupled to the body section adjacent the dashboard opening to selectively provide and inhibit access to the storage cavity through the dashboard opening.

4. The dashboard of claim 3, further comprising a latch assembly for selectively maintaining the door in a closed position over the dashboard opening.

5. The dashboard of claim 3, further comprising a hinge that pivotably connects the door to the body section.

6. The dashboard of claim 3, further including a locking mechanism for maintaining the door in a closed position to inhibit unwanted entry into the storage cavity through the dashboard opening.

7. The dashboard of claim 1, wherein the mounting tab includes at least one of scallops and clearance holes that provide clearance for the fasteners.

8. A vehicle comprising:
   a frame;
   a plurality of wheels mounted to the frame;
   a body disposed on the frame and defining a storage cavity with an access opening and a support surface located adjacent the access opening, a plurality of mounting holes formed in the body;
   a dashboard accessory member connected to the body generally below the access opening and defining a groove;
   a dashboard arranged to substantially obstruct the access opening and defining a mounting tab and a lower edge, the lower edge engaged with the groove, and the mounting tab positioned adjacent the support surface; and
   a retainer coupled to the body via fasteners that engage the mounting holes such that the mounting tab is sandwiched between the retainer and the mounting surface to secure the dashboard in place.

9. The vehicle of claim 8, further comprising a steering wheel and a steering wheel column, the steering wheel in communication with the wheels to affect the direction of travel of the vehicle;
   wherein the dashboard accessory member includes a steering wheel base, an ignition assembly mounting section, a tray, and a cup holder;
   wherein the steering wheel column passes through the steering wheel base such that the steering wheel base surrounds the steering wheel column;
   wherein the steering wheel base, the ignition assembly mounting section, the tray, and the cup holder combine to define a nonlinear and uneven contour;
   wherein the groove is defined along at least a portion of the contour by at least one of the steering wheel base, the ignition assembly mounting section, the tray, and the cup holder; and
   wherein the dashboard may be installed across the access opening without removal of any of the steering wheel base, the ignition assembly mounting section, the tray, and the cup holder.

10. The vehicle of claim 8, wherein the mounting tab includes at least one of a scallop and a clearance hole that provide clearance for the fasteners.

11. The vehicle of claim 8, wherein the groove is defined by at least a substantially vertical retention surface and a substantially horizontal support surface.

12. The vehicle of claim 8, wherein the dashboard accessory member includes at least one of a steering wheel base, an ignition assembly mounting section, a tray, and a cup holder.

13. The vehicle of claim 8, wherein the groove forms an uneven and nonlinear contour, the lower edge shaped to substantially match the contour.

14. The vehicle of claim 8, further comprising a steering wheel, the dashboard installable without removal of the steering wheel or alteration of the dash board accessory member.

15. A method of installing a dashboard on a vehicle, the vehicle including
   a frame, a plurality of wheels mounted to the frame, and a body disposed on the frame, the body having a brow, a front end member, a storage cavity, a retainer, and a dashboard accessory member, the storage cavity being between the brow and the front end member, the storage cavity having an access opening, the retainer being coupled to the brow, the dashboard accessory member including a steering wheel base, an ignition assembly mounting section, a tray, and a cup holder, the steering wheel base, the ignition assembly mounting section, the tray, and the cup holder combining to define a nonlinear and uneven contour, and a groove being defined along the contour by at least one of the steering wheel base, the ignition assembly mounting section, the tray, and the cup holder, and the lower edge of the dashboard shaped to follow the contour, the method comprising:
   providing a dashboard that includes a body section having a mounting tab, and a lower edge;
   removing the retainer from the brow;

after removing the retainer, installing the dashboard by engaging the lower edge with the groove such that the groove vertically supports and horizontally retains the dashboard, and positioning the mounting tab adjacent the brow such that the body section substantially occupies the access opening and inhibits access to the storage area;

after installing the dashboard, installing the retainer onto the brow such that the mounting tab is sandwiched between the retainer and the brow; and maintaining the dashboard installed on the vehicle via engagement of the lower edge with the groove and engagement of the retainer with the mounting tab.

16. The method of claim 15, wherein the brow includes a plurality of brow mounting holes and wherein the retainer is secured to the brow with a plurality of fasteners received in the brow mounting holes;

wherein providing a dashboard includes providing in the mounting tab a plurality of fastener clearance members comprised of at least one of dashboard mounting holes and dashboard mounting scallops;

wherein the step of removing the retainer includes removing the fasteners from the brow mounting holes to release the retainer, and removing the retainer from the brow;

wherein positioning the mounting tab adjacent the brow includes aligning the fastener clearance members with the brow mounting holes; and wherein installing the retainer onto the brow includes extending the fasteners through the fastener clearance members, and engaging the fasteners with the brow mounting holes.

\* \* \* \* \*